United States Patent
Matus

(10) Patent No.: US 9,391,994 B2
(45) Date of Patent: Jul. 12, 2016

(54) CONTEXTUAL DEVICE LOCKING/UNLOCKING

(71) Applicant: Facebook, Inc., Menlo Park, CA (US)

(72) Inventor: Jonathan Arie Matus, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 14/537,704

(22) Filed: Nov. 10, 2014

(65) Prior Publication Data

US 2015/0067791 A1    Mar. 5, 2015

Related U.S. Application Data

(63) Continuation of application No. 13/662,187, filed on Oct. 26, 2012, now Pat. No. 8,914,875.

(51) Int. Cl.
*H04L 29/06* (2006.01)
*G06F 21/30* (2013.01)
*G06F 21/32* (2013.01)
(Continued)

(52) U.S. Cl.
CPC .............. *H04L 63/101* (2013.01); *G06F 21/30* (2013.01); *G06F 21/31* (2013.01); *G06F 21/32* (2013.01); *G06Q 10/10* (2013.01); *H04L 67/18* (2013.01); *H04M 1/66* (2013.01); *H04M 1/72563* (2013.01); *G06F 2221/032* (2013.01); *G06F 2221/2139* (2013.01); *G06Q 50/01* (2013.01); *H04M 1/72569* (2013.01)

(58) Field of Classification Search
CPC ....... G06F 21/31; G06F 21/32; H04L 63/101; H04L 63/102; H04L 63/0853
USPC ........................................................... 726/17
See application file for complete search history.

(56) References Cited

U.S. PATENT DOCUMENTS 8,261,090 B1    9/2012  Matsuoka
2005/0046580 A1    3/2005  Miranda-Knapp et al.
(Continued)

FOREIGN PATENT DOCUMENTS

CN    101702795 A    5/2010
EP    0236404 A1    9/2011

OTHER PUBLICATIONS

Israeli Office Action for Application No. 238341 (with translation), Jul. 1, 2015.
(Continued)

*Primary Examiner* — Syed Zaidi
(74) *Attorney, Agent, or Firm* — Baker Botts L.L.P.

(57) ABSTRACT

Particular embodiments of a computing device associated with a user may detect an event using a sensor of the computing device. The event may be a lock-triggering event or an unlock-triggering event. The computing device may assess a state of the device. The computing device may also access further information associated with the user. The computing device may also monitor activity on the computing device to detect further events if such further monitoring is warranted. Based on the gathered information, the computing device may update a lock status of the device to lock or unlock access interfaces of the computing device, functionality of the computing device, or content accessible from the computing device. If the event comprised the computing device detecting an attempt by a third party to use the device, the device may attempt to identify the third party to determine if they are authorized to use the device.

20 Claims, 5 Drawing Sheets

(51) Int. Cl.
*G06Q 10/10* (2012.01)
*H04M 1/66* (2006.01)
*H04M 1/725* (2006.01)
*H04L 29/08* (2006.01)
*G06F 21/31* (2013.01)
*G06Q 50/00* (2012.01)

(56) References Cited

U.S. PATENT DOCUMENTS

| | | | | |
|---|---|---|---|---|
| 2006/0288234 A1* | 12/2006 | Azar | ............ | G06F 21/32 713/186 |
| 2008/0120716 A1* | 5/2008 | Hall | ............ | G06F 21/88 726/16 |
| 2010/0015976 A1* | 1/2010 | Issa | ............ | G06F 17/30699 455/435.1 |
| 2011/0081889 A1 | 4/2011 | Fao et al. | | |
| 2011/0088086 A1 | 4/2011 | Swink et al. | | |
| 2011/0105096 A1 | 5/2011 | Dods et al. | | |
| 2012/0235790 A1 | 9/2012 | Zhao et al. | | |
| 2014/0053258 A1* | 2/2014 | Lin | ............ | G06F 21/31 726/19 |

OTHER PUBLICATIONS

Korean Office Action for Application No. 10-2015-7013587 (with translation), Sep. 4, 2015.
Communication Pursuant to Article 94(3) EPC received from the EPO for EP Application No. 13 189 504.7-1958, Feb. 24, 2016.
Notification of the First Office Action received for Chinese Application No. 2013800562657, dated Feb. 23, 2016.

* cited by examiner

CONTEXTUAL DEVICE LOCKING/UNLOCKING

RELATED APPLICATION

This application is a continuation of U.S. patent application Ser. No. 13/662,187, filed Oct. 26, 2012, entitled "Contextual Device," which is currently pending.

TECHNICAL FIELD

This disclosure generally relates to computing devices, in particular, security measures for computing devices.

BACKGROUND

A computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments of a computing device associated with a user may detect an event using a sensor of the computing device. The event may be a lock-triggering event or an unlock-triggering event. The computing device may assess a state of the device. The computing device may also access further information associated with the user. The computing device may also monitor activity on the computing device to detect further events if such further monitoring is warranted. Based on the gathered information, the computing device may update a lock status of the device to lock or unlock access interfaces of the computing device (e.g., screen, touchscreen, keyboard, other I/O devices), functionality of the computing device, or content accessible from the computing device. In particular embodiments, the access interfaces may be only partially unlocked, so as enable partial access to less sensitive applications or features (e.g., adjusting volume, viewing notification statistics, playing children's games). If the event comprised the computing device detecting an attempt by a third party to use the device, the device may attempt to identify the third party to determine if they are authorized to use the device.

DESCRIPTION OF PARTICULAR EMBODIMENTS

Figure 1B:
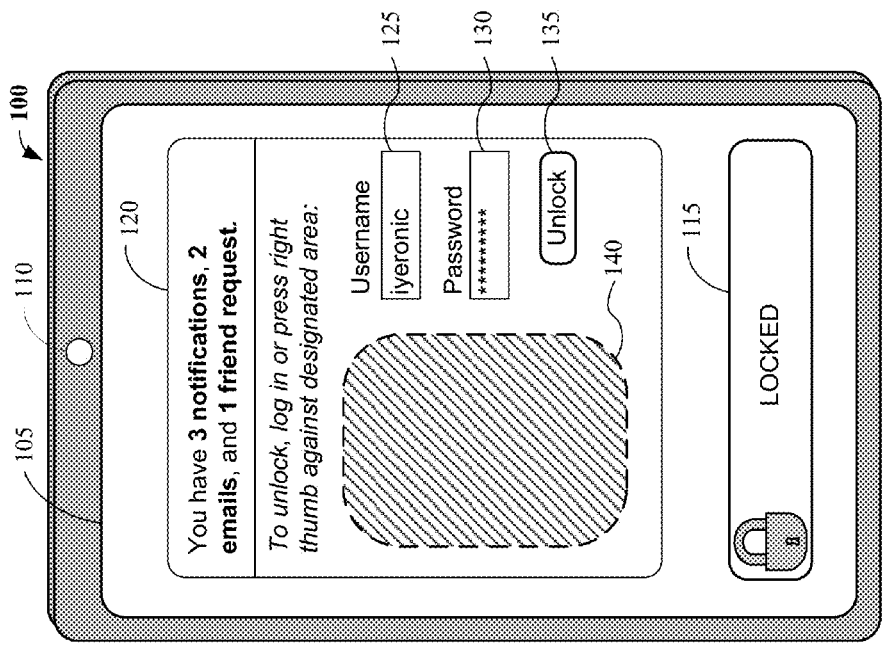
FIGS. 1A-B are example wireframes showing an example of contextual device locking/unlocking
Figure 1A:
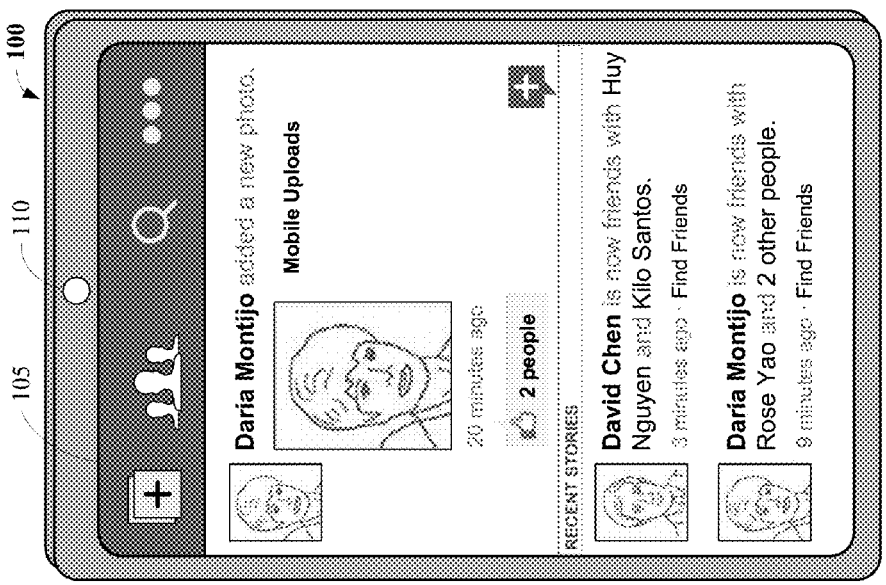

FIGS. 1A-B are example wireframes showing an example of contextual locking/unlocking of a user's computing device. In particular embodiments, mobile device 100 includes a touchscreen 105 and a camera 110. Mobile device 100 may be able to connect to a social-networking system by way of a communications network, such as a cell network or Wi-Fi. Particular embodiments of a network environment associated with a social-networking system are described in further detail in FIG. 4 and related text in the specification. Mobile device 100 may be able to detect its own location via GPS. Mobile device 100 may also include an accelerometer that can detect the motion of mobile device 100 within three dimensions. Mobile device 100 may also include a gyrometer that detects the orientation of mobile device 100 (e.g., whether mobile device 100 is tilted up or down, or turned horizontal). Mobile device 100 may further include sensors to perform biometric identification, such as by using camera 110 to capture an image in order to perform facial recognition, or by using sensors within touchscreen 105 to capture a fingerprint. Mobile device 100 may further include touch sensors and proximity sensors distributed over its exterior surface. As one of skill in the art would be aware, embodiments of the invention are not limited to receiving requests from or sending information to a mobile device and may be performed in association with other types of computing devices as described in FIG. 3 and related text in the specification.

The user associated with mobile device 100 may be a member of a social-networking system, in which the computing device user's profile, connection information, and content associations are maintained. The user may be represented by a user node in the social graph. Embodiments of a social graph are described in further detail with respect to FIG. 5. Friends of the user may also be represented by user nodes in the social graph and connected to the user by edges in the social graph representing one or more degrees of separation. Content with which the user is associated may be represented by concept nodes in the social graph. Particular embodiments of the social graph are described in further detail in FIG. 5 and related text in the specification.

As shown in FIG. 1A, the user has logged in to mobile device 100 and the user's personal information, such as their profile, newsfeed, contacts, messages, preferences, etc. is accessible. In an example scenario, after the user logs in to mobile device 100, touch sensors on the back of mobile device 100 are able to detect that the user is holding mobile device 100. In this example, even when the user props up mobile device 100 on a cushion so as to view screen 105 more comfortably, mobile device 100 is still able to detect the user is looking at the screen by performing periodic biometric identification by way of facial recognition using camera 110. However, at one point, the user steps away from the device (e.g., to take a phone call or eat a meal), and mobile device 100 may detect that nobody is looking at the screen. After a minute or so, mobile device 100 may detect an event—that some unknown person (i.e., someone other than the user) is looking at the screen, such as, for example, by performing facial recognition. At this point, mobile device 100 may assess its state and determine that the information currently on display is of a personal nature. Mobile device 100 may determine that one or more functions and/or access interfaces of the mobile computing device should be locked. Mobile device 100 may then update its lock status and display a lock screen to the unknown person, as illustrated in FIG. 1B.

In particular embodiments, mobile device 100 may also attempt to use the facial recognition information to determine whether mobile device 100 is able to identify the unknown person. In the case where mobile device 100 is able to identify the unknown person (as, for example, the user's spouse, child, or friend), mobile device 100 may either choose not to lock its functions and/or access interfaces, or to only lock particular functions and/or access interfaces.

In particular embodiments, mobile device 100 may detect that an unknown person is looking at the screen, but upon assessing its state, mobile device 100 may determine that because no personal information is being displayed (e.g., only a browser window displaying the website for the New York Times newspaper), there is no immediate need to lock the screen. However, at this point, mobile device 100 may monitor activity on the device in order to detect whether the unknown person is attempting to use the device in an unauthorized manner (e.g., the person may be allowed to scroll the page up or down, but not to click on links within the website for the New York Times).

As shown in FIG. 1B, touchscreen 105 displays the lock status 115 of mobile device 100, as well as an information/login area 120. In particular embodiments, information/login area 120 may summarize updates received at mobile device 100: "You have 3 notifications, 2 emails, and 1 friend request." Information/login area 120 also displays a text input field 125 for entry of a username, text input field 130 for entry of a password, and "Unlock" button 135, which submits the user-entered username and password for authentication. Information/login area 120 also displays a biometric identification area 140 where the user can provide a thumb scan and displays instructions: "To unlock, log in or press right thumb against designated area."

In another example, mobile device 100 may automatically lock its access interfaces when placed into a bag, holster, or other enclosure (so as to avoid inadvertent user input), and then unlock its access interfaces when removed from the enclosure.

Figure 2:
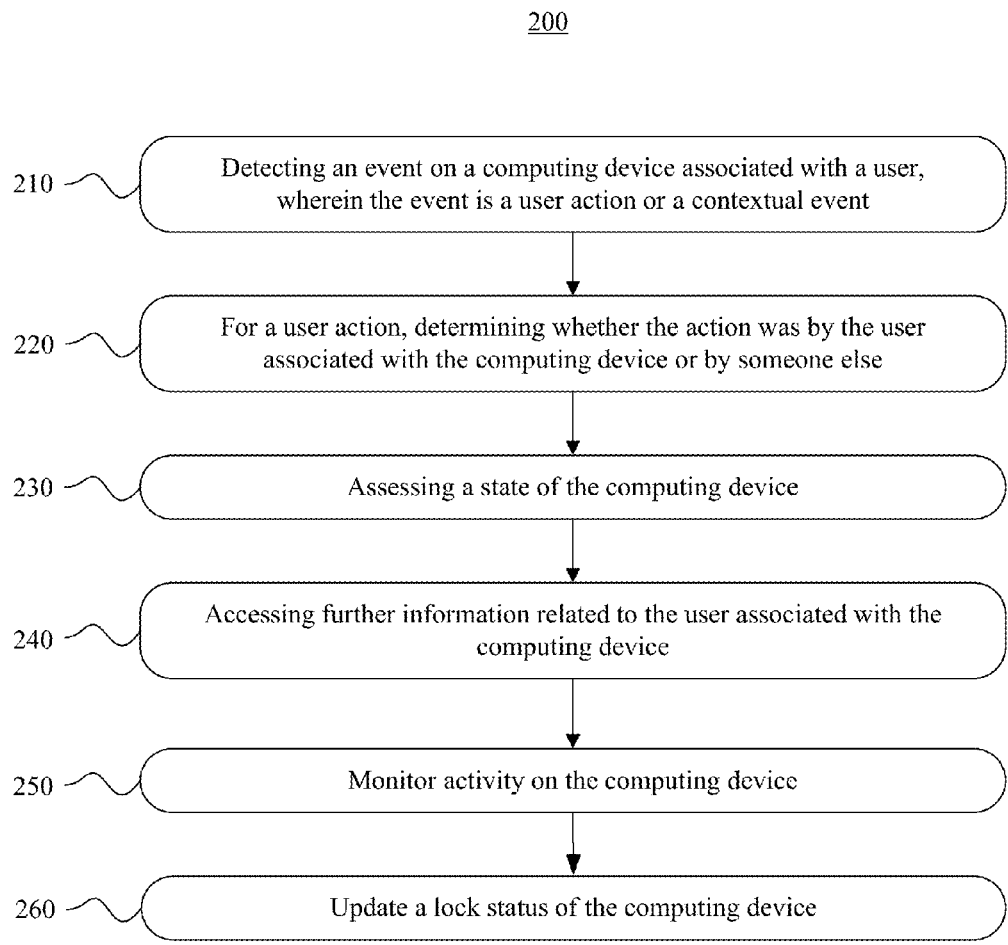
FIG. 2 is a flowchart of an example method according to particular embodiments.

The steps involved in contextual locking/unlocking, as shown in FIG. 1, are described in further detail in FIG. 2 and related text in the specification.

FIG. 2 is a flowchart of an example method for displaying social-networking information in conjunction with an image of a real-world environment. In step 210, particular embodiments maintain social-networking information for a user represented by a user node in a social graph.

In step 210, particular embodiments of a computing device associated with a user may detect an event on the computing device. The event may comprise one of two types a lock-triggering event or an unlock-triggering event. A lock-triggering event may comprise any of a number of different events, such as, by way of example and not limitation:
 closing a lid of the computing device;
 placing the computing device on standby;
 placing the computing device into an enclosure, such as a bag, sleeve, holster, or stand;
 placing the computing device onto a surface with a screen of the computing device facing down;
 detection that a third party is looking at a screen of the computing device by using biometric identification, such as looking at the computing device so as to allow the camera to capture an image of a face for performing facial recognition, or an image of a retina for performing a retina scan, or placing a finger on a sensor in order to capture a fingerprint;
 disconnection of the computing device from a communications network designated as being familiar, e.g., a wifi network designated as one's home network;
 detection that the computing device has been removed from being within proximity of a designated familiar device, e.g., a smartphone detecting that it has been moved from being next to one's spouse's phone or one's laptop;
 receipt of a personal communication while the computing device is not within the user's control, e.g., the user is not holding the device and/or is not looking at the screen;
 detection that the computing device has been removed from being in a designated familiar location, e.g., the user's home (which may be detected by, for example, GPS or cell tower triangulation), or on a desk with an embedded RFID tag; or
 detection of an unauthorized attempt to download information to the computing device or retrieve information from the computing device, such as, for example, by way of a networking connection such as an infrared or other near-field communication (NFC)-type technology capable of pulling information from and/or pushing information to the computing device.

An unlock-triggering event may comprise any of a number of different events, such as, by way of example and not limitation:
 opening a lid of the computing device;
 removing the computing device from an enclosure;
 detection based on biometric identification that the user is looking at a screen of the computing device;
 detection, by one or more touch sensors, that the user is handling the computing device;
 connection of the computing device to a communications network designated as being familiar;
 detection that the computing device has been placed within proximity of a designated familiar device; or
 detection that the computing device has been placed in a designated familiar location.

In step 220, the computing device may determine whether the user action was taken by the user of the computing device, or by another person. This determination may be based on biometric identification. If the user action was taken by another person, the computing device may determine whether the person is another user associated with the computing device, an identifiable person associated with the user, or a stranger who is not known to the user and/or not identifiable. In particular embodiments, the computing device may determine that a third party is unauthorized if the third party is not on a list of users authorized to use the computing device or if the third party is on a blacklist of users who are blocked from using the computing device.

In particular embodiments, the computing device may also attempt to determine the identity of the third party based on the facial recognition data. In particular embodiments, the computing device may store facial recognition data for previous users of the computing device in association with requested identifying information; for example, if a family member of the user has previously used the computing device, the computing device may have obtained a unique identifier, such as, for example, an email address or username, and stored the unique identifier in association with that person's facial recognition data for the purpose of recognizing that user in the future. In particular embodiments, the computing device may also attempt to determine a unique identifier for the person by accessing information in a database that may be able to provide identifying information for a person based on facial recognition data. In particular embodiments, the computing device may utilize such identifying information for the person to determine whether the person is connected to the user with respect to a social-networking system.

In particular embodiments, once the computing device has identified the unknown person, the computing device may attempt to retrieve further information associated with the now-identified third party to help determine whether to lock all access to the computing device, or whether it may be ok to leave some or all functions of the computing device unlocked. For example, if the computing device identifies the third party as being the spouse of the user, a trusted colleague of the user, or another registered user of the computing device, the computing device may not lock any of its functions, or it may lock access to only some sensitive information or personal applications, or, in the case of the other registered user of the computing device, it may simply place the user's computing state on standby and provide a login interface for the other registered user to log in and use the device. In particular embodiments, if the third party is identified as a social-networking connection of the user ("a friend"), the computing device may employ functionality to access a social graph associated with the social-networking system to determine how closely connected the friend is to the user. For example, the computing device may not lock all or any of its functions if it can be determined that the third party is a close friend (e.g., connected by one degree of separation with respect to the social graph). In particular embodiments, the user may be able to set preferences with respect to their social graph connections to assign different levels of locking the user's computing device. Such preferences may be based on any social-networking information available, e.g., threshold degree of separation, group affiliation, family/household indicators, etc.

In step 230, particular embodiments of the computing device may assess a state of the device in order to help determine whether and/or how to update the lock status of the device. For example, and not by way of limitation, assessing the state of the device may include:
- determining the current lock status of the computing device—e.g., is the device currently locked, partially locked, or unlocked?
- determining a location of the computing device—e.g., according to GPS information, is the device currently at a location that corresponds to the user's home or office?
- determining a communications environment of the computing device—e.g., is the device currently connected to a wifi network associated with the user's home or office?
- determining what other devices are in physical proximity to the computing device—e.g., is the device able to sense that the user's spouse's phone is near by?
- determining whether a screen of the computing device is visible—e.g., would another person be able to see what is being displayed on the screen?
- determining what is being displayed on the screen—e.g., is there personal information being displayed on the screen? Or publicly-accessible content?
- determining a length of time that the computing device has been idle—e.g., has the device been untouched for the last three hours (such as, for example, may be the case if someone were watching a movie on it, but should be less likely if someone were in the middle of editing a document)?
- determining a length of time since the computing device was last used by the user—e.g., has it been an unusually long period of time since the user last accessed the device?

In step 240, particular embodiments of the computing device may access further information related to the user associated with the computing device in order to help determine whether and/or how to update the lock status of the device. Additional information may include, by way of example and not limitation:
- calendar information for the user—e.g., in order to determine whether, on a particular day and at a particular time, the user is expected to be at home or at the office or somewhere else;
- profile information of the user—e.g., in order to determine the user's home address and work address;
- configuration settings of the computing device—e.g., in order to determine what networks, devices, and locations are designated as familiar;
- a usage history associated with the computing device—e.g., in order to determine at what times the user typically uses the device.

In step 250, particular embodiments of the computing device may monitor further activity on the device by the detected third party in order to help determine whether and/or how to update the lock status of the device. In particular embodiments, once the computing device has identified that a third party is looking at the device, the computing device may monitor activity on the device while the third party is looking at the device, until the computing device detects that the user of the device has returned and has taken control of the device, in order to determine whether the third party is attempting to access any information or functions on the device. In particular scenarios, such as, for example, if the user was watching a video and paused the video while taking a restroom break, the computing device may determine that it is ok for the third party to view the screen but not for the third party to attempt to use the device to access any functions on the device—if this were to occur as the computing device is monitoring activity on the device, the computing device may then update its lock status to lock its access interfaces. In this case, when determining whether to lock all access to the computing device, or whether it may be ok to leave some or all functions of the computing device unlocked, the computing device may also consider what sort of activity was attempted by the third party.

In step 260, particular embodiments of the computing device update the lock status of the device to lock or unlock one or more access interfaces of the device, lock or unlock one or more functions of the device, or block or allow access to particular content or all content accessible from the computing device. Updating the lock status may also include logging the event in association with the lock status and a timestamp. In particular embodiments, access may only be partially locked or blocked, so as enable partial access to less sensitive applications or features such as, for example, adjusting volume, viewing publicly-accessible content, or playing children's games.

In particular embodiments, the computing device may determine that the event indicates a security issue related to unauthorized attempted use of the computing device by a third-party—in such a scenario, the computing device may either generate a notification about the event to the user, to be displayed on the device and/or sent to the user (e.g., via email or text message). The computing device may also activate an alarm on the device.

Figure 3:
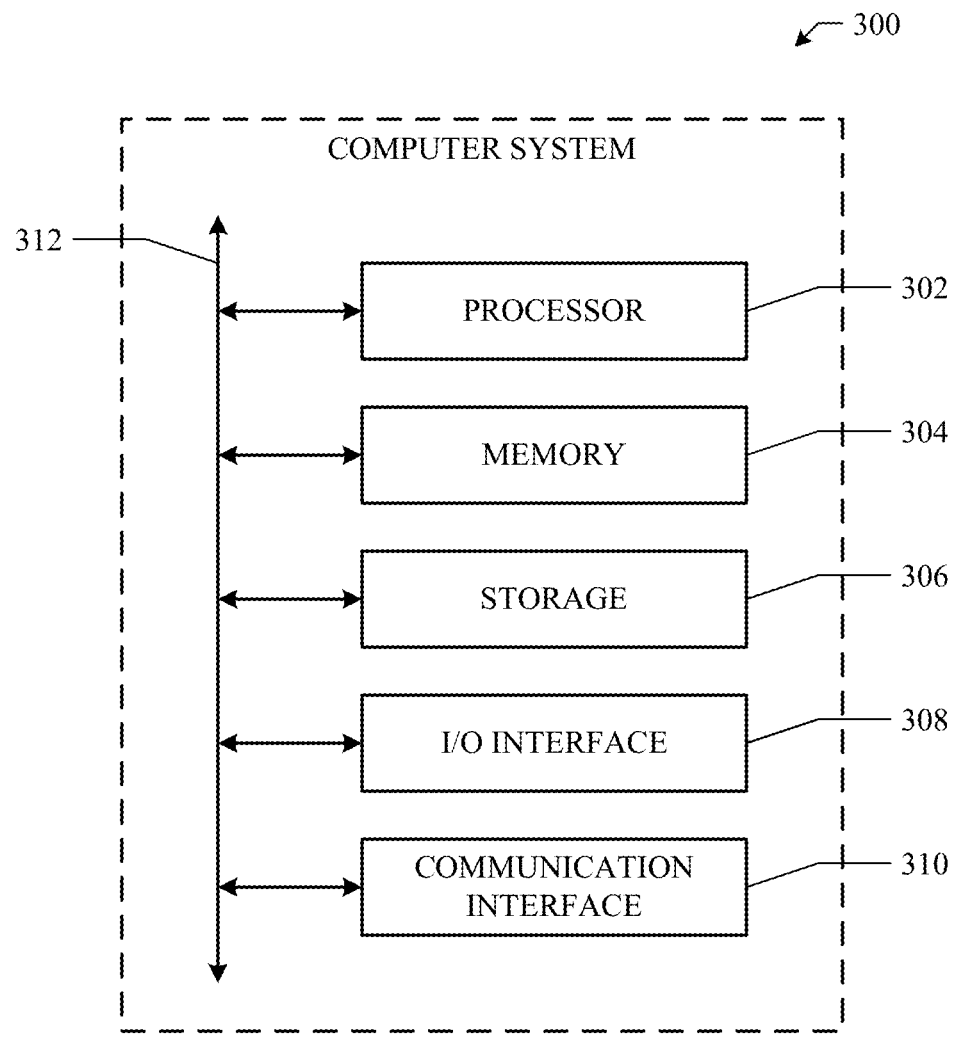
FIG. 3 is a block diagram of an example computing device.

FIG. 3 is a block diagram of an example computing device 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more access interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, I/O interface 308 may include various types of sensors, such as, for example and without limitation: touch sensors (disposed, for example, on a display of the computing device, the back of the computing device and/or one or more lateral edges of the computing device) for detecting a user touching the surface of the computing device (e.g., using one or more fingers); accelerometer for detecting whether the computing device 300 is moving and the speed of the movement; thermometer for measuring the temperature change near the computing device 300; proximity sensor for detecting the proximity of the computing device 300 to another object (e.g., a hand, desk, or other object); light sensor for measuring the ambient light around the computing device 300; imaging sensor (e.g., camera) for capturing digital still images and/or video of objects near the computing device 300 (e.g., scenes, people, bar codes, QR codes, etc.); location sensors (e.g., Global Positioning System (GPS)) for determining the location (e.g., in terms of latitude and longitude) of the computing device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of computing device 300; etc. This disclosure contemplates that a computing device may include any applicable type of sensor. Sensors may provide various types of sensor data, which may be analyzed to determine the user's intention with respect to the computing device at a given time.

In particular embodiments, determining a location of the computing device is based on GPS information, triangulation information, proximity to one or more other designated safe devices, calendar information, or any combination thereof.

In particular embodiments, in addition to the front side, computing device 300 may have one or more sensors for performing biometric identification. Such sensors may be positioned on any surface of computing device 300. In example embodiments, as the user's hand touches computing device 300 to grab hold of it, the touch sensors may capture the user's fingerprints or palm vein pattern. In example embodiments, while a user is viewing the screen of computing device 300, a camera may capture an image of the user's face to perform facial recognition. In example embodiments, while a user is viewing the screen of computing device 300, an infrared scanner may scan the user's iris and/or retina. In example embodiments, while a user is in contact or close proximity with computing device 300, chemical and/or olfactory sensors may capture relevant data about a user. In particular embodiments, upon detecting that there is a change in state with respect to the identity of the user utilizing computing device 300, either by itself or in combination with other types of sensor indications, computing device 300 may determine that it is being shared.

In particular embodiments, in addition to the front side, the computing device 300 may have touch sensors on the left and right sides. Optionally, the computing device 300 may also have touch sensors on the back, top, or bottom side. Thus, as the user's hand touches computing device 300 to grab hold of it, the touch sensors may detect the user's fingers or palm touching computing device 300. In particular embodiments, upon detecting that there is a change in state with respect to a user touching computing device 300, either by itself or in combination with other types of sensor indications, computing device 300 may determine that it is being shared.

In particular embodiments, computing device 300 may have an accelerometer in addition to or instead of the touch sensors on the left and right sides. Sensor data provided by the accelerometer may also be used to estimate whether a new user has picked up computing device 300 from a resting position, e.g., on a table or desk, display shelf, or from someone's hand or from within someone's bag. When the user picks up computing device 300 and brings it in front of the user's face, there may be a relatively sudden increase in the movement speed of computing device 300. This change in the computing device's movement speed may be detected based on the sensor data supplied by the accelerometer. In particular embodiments, upon detecting that there is a significant increase in the speed of the computing device's movement, either by itself or in combination with other types of sensor indications, computing device 300 may determine that it is being shared.

In particular embodiments, computing device 300 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of computing device 300. When computing device 300 is stored on a shelf or in the user's bag, it may stay mostly in one orientation. However, when the user grabs hold of computing device 300 and lifts it up and/or moves it closer to bring it in front of the user's face, there may be a relatively sudden change in the orientation of computing device 300. The orientation of computing device 300 may be detected and measured by the gyrometer. If the orientation of computing device 300 has changed significantly, In particular embodiments, upon detecting that there is a significant change in the orientation of computing device 300, either by itself or in combination with other types of sensor indications, computing device 300 may determine that it is being shared.

In particular embodiments, computing device 300 may have a light sensor. When computing device 300 is stored in a receptacle, e.g., the user's pocket or bag, or in a case or holster, it is relatively dark around computing device 300. On the other hand, when the user brings computing device 300 out of his pocket, it may be relatively bright around computing device 300, especially during day time or in well-lit areas. The sensor data supplied by the light sensor may be analyzed to detect when a significant change in the ambient light level around computing device 300 occurs. In particular embodiments, upon detecting that there is a significant increase in the ambient light level around computing device 300, either by itself or in combination with other types of sensor indications, computing device 300 may determine that it is being shared.

In particular embodiments, computing device 300 may have a proximity sensor. The sensor data supplied by the proximity sensor may be analyzed to detect when computing device 300 is in close proximity to a specific object, such as the user's hand. For example, computing device 300 may have an infrared LED (light-emitting diode) (i.e., proximity sensor) placed on its back side. When the user holds such a computing device in his hand, the palm of the user's hand may cover the infrared LED. As a result, the infrared LED may detect when the user's hand is in close proximity to computing device 300. In particular embodiments, upon detecting that computing device 300 is in close proximity to the user's hand, either by itself or in combination with other types of sensor indications, computing device 300 may determine that it is being shared.

A computing device 300 may have any number of sensors of various types, and these sensors may supply different types of sensor data. Different combinations of the individual types of sensor data may be used together to detect and estimate a user's current intention with respect to computing device 300 (e.g., whether the user really means to take computing device 300 out of his pocket and use it). Sometimes, using multiple types of sensor data in combination may yield a more accurate, and thus better, estimation of the user's intention with respect to computing device 300 at a given time than only using a single type of sensor data. Nevertheless, it is possible to estimate the user's intention using a single type of sensor data (e.g., touch-sensor data).

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4:
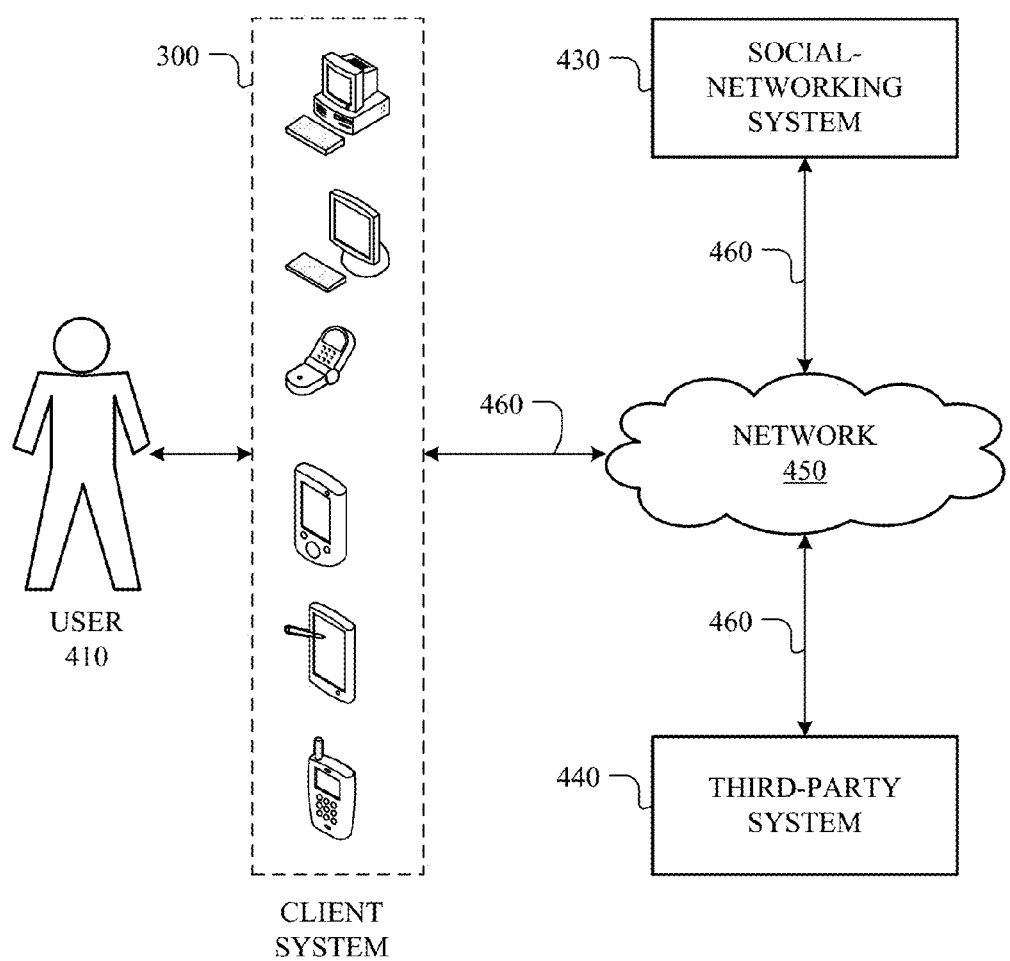
FIG. 4 is a block diagram of an example network environment.

FIG. 4 illustrates an example network environment 400. Network environment 400 includes a user 410, a client system 300, a social-networking system 430, and a third-party system 440 connected to each other by a network 450. Although FIG. 4 illustrates a particular arrangement of user 410, client system 300, social-networking system 430, third-party system 440, and network 450, this disclosure contemplates any suitable arrangement of user 410, client system 300, social-networking system 430, third-party system 440, and network 450. As an example and not by way of limitation, two or more of client system 300, social-networking system 430, and third-party system 440 may be connected to each other directly, bypassing network 450. As another example, two or more of client system 300, social-networking system 430, and third-party system 440 may be physically or logically co-located with each other in whole or in part. Moreover, although FIG. 4 illustrates a particular number of users 410, client systems 300, social-networking systems 430, third-party systems 440, and networks 450, this disclosure contemplates any suitable number of users 410, client systems 300, social-networking systems 430, third-party systems 440, and networks 450. As an example and not by way of limitation, network environment 400 may include multiple users 410, client system 300, social-networking systems 430, third-party systems 440, and networks 450.

In particular embodiments, user 410 may be an individual (human user), an entity (e.g., an enterprise, business, or third-party application), or a group (e.g., of individuals or entities) that interacts or communicates with or over social-networking system 430. In particular embodiments, social-networking system 430 may be a network-addressable computing system hosting an online social network. Social-networking system 430 may generate, store, receive, and transmit social-networking data, such as, for example, user-profile data, concept-profile data, social-graph information, or other suitable data related to the online social network. Social-networking system 430 may be accessed by the other components of network environment 400 either directly or via network 450. In particular embodiments, social-networking system 430 may include an authorization server that allows users 410 to opt in or opt out of having their actions logged by social-networking system 430 or shared with other systems (e.g., third-party systems 440), such as, for example, by setting appropriate privacy settings. In particular embodiments, third-party system 440 may be a network-addressable computing system that can host third-party content objects and serve content, and/or provide a third-party advertisement serving engine. Third-party system 440 may generate, store, receive, and transmit third-party content and/or sponsored content, such as, for example, advertisements, incentive program notifications, coupons, etc. Third-party system 440 may be accessed by the other components of network environment 400 either directly or via network 450. In particular embodiments, one or more users 410 may use one or more client systems 300 to access, send data to, and receive data from social-networking system 430 or third-party system 440. Client system 300 may access social-networking system 430 or third-party system 440 directly, via network 450, or via a third-party system. As an example and not by way of limitation, client system 300 may access third-party system 440 via social-networking system 430. Client system 300 may be any suitable computing device, such as, for example, a personal computer, a laptop computer, a cellular telephone, a smartphone, or a tablet computer.

This disclosure contemplates any suitable network 450. As an example and not by way of limitation, one or more portions of network 450 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 450 may include one or more networks 450.

Links 460 may connect client system 300, social-networking system 430, and third-party system 440 to communication network 450 or to each other. This disclosure contemplates any suitable links 460. In particular embodiments, one or more links 460 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 460 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 460, or a combination of two or more such links 460. Links 460 need not necessarily be the same throughout network environment 400. One or more first links 460 may differ in one or more respects from one or more second links 460.

Figure 5:
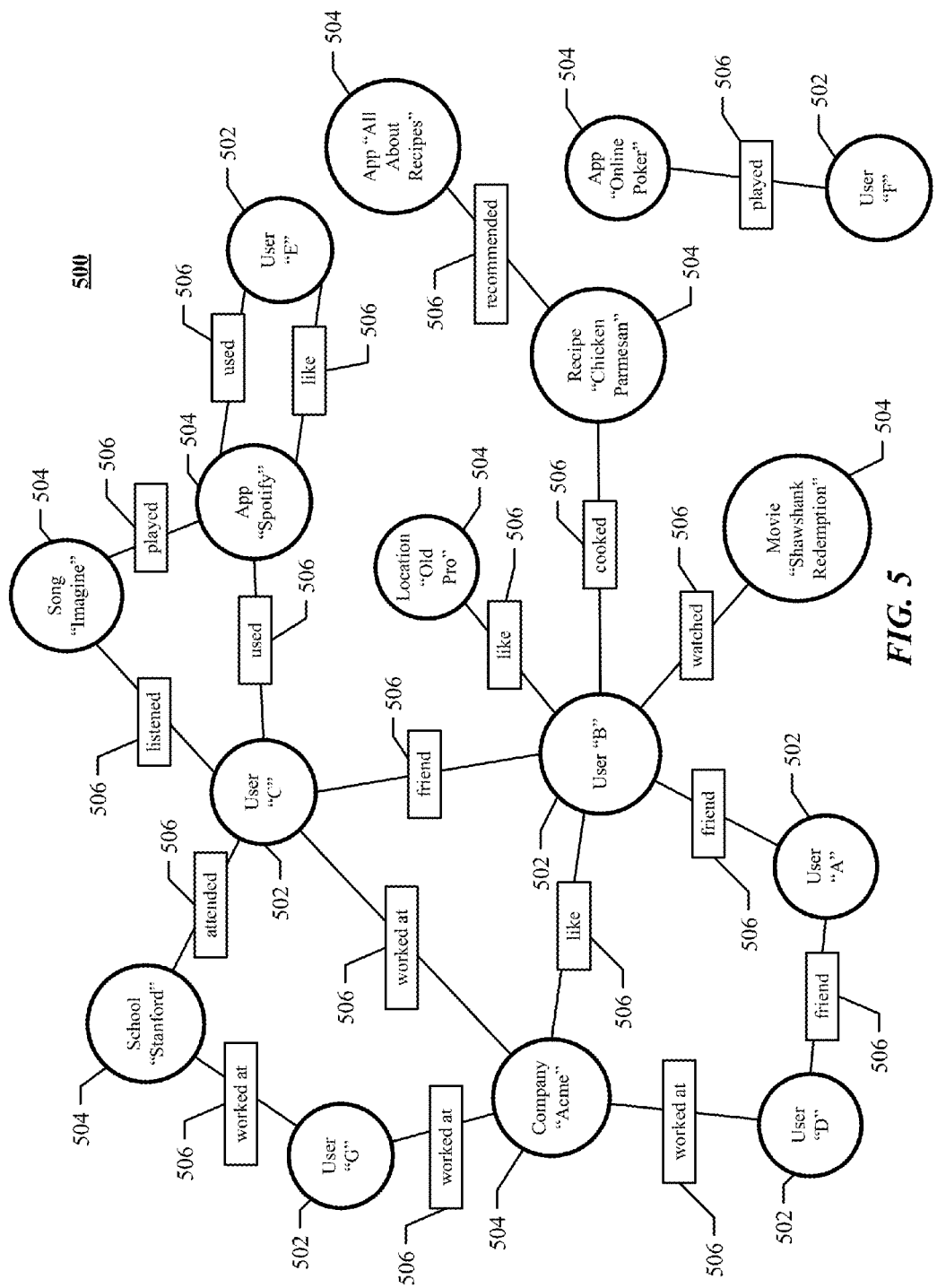
FIG. 5 is an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party server 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 430 to send to social-networking system 460 a message indicating the user's action. In response to the message, social-networking system 460 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 24. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by one or more computer servers of an online social network, from a first client device associated with a first user, unique data identifying a second user, the unique data being determined in response to an event detected by the first client device, wherein the event was triggered by the second user;
   accessing, by one or more computer servers of the online social network, social-networking information associated with the first user and the second user, wherein the one or more computer servers of the online social network look up the social-networking information using the received unique data;
   determining, by one or more computer servers of the online social network, a level of access to access interfaces of the first client device, functionality of the first client device, or content accessible from the first client device, wherein the determining is based on the social-networking information; and
   sending, by one or more computer servers of the online social network, instructions to evaluate a lock status of the first client device, the instructions comprising the determined level of access to the first client device.

2. The method of claim 1, wherein the event comprises receipt of information indicating:
   closure of a lid of the first client device;
   placement of the first client device into an enclosure;
   placement of the first client device onto a surface with a screen of the first client device facing down;
   detection that the second party is looking at a screen of the first client device;
   detection that the second party is attempting to use or handle the first client device;
   disconnection of the first client device from a communications network designated as a familiar network;
   detection that the first client device has been removed from being within proximity of a designated familiar device;
   receipt of a personal communication while the first client device is not within the first user's control; or
   detection that the first client device has been removed from being in a designated familiar location.

3. The method of claim 1, wherein the event comprises receipt of information indicating:
   release of a lid of the first client device;
   removal of the first client device from an enclosure;
   detection based on biometric identification that the first user is looking at a screen of the first client device;
   detection, by one or more sensors, that the first user is handling the first client device;
   connection of the first client device to a communications network designated as being familiar;
   detection that the first client device has been placed within proximity of a designated familiar device; or
   detection that the first client device has been placed in a designated familiar location.

4. The method of claim 1, wherein the unique data comprises an identifier for the second user, the identifier determined based on biometric identification, and wherein the one or more computer servers of the online social network access the social-networking information using the identifier.

5. The method of claim 1, wherein the social-networking information indicates whether the second user is authorized to use the first client device.

6. The method of claim 1, further comprising:
   receiving, by one or more computer servers of the online social network, from the first client device, a state of the first client device; wherein
   the determining the level of access is further based on the state of the first client device.

7. The method of claim 6, wherein the state of the first client device comprises:
   a lock status of the first client device;
   a location of the first client device;
   a communications environment of the first client device;
   other devices that are in physical proximity to the first client device;
   whether a screen of the first client device is visible;
   what is being displayed on the screen;
   a length of time that the first client device has been idle; or
   a length of time since the first client device was last used by the first user.

8. The method of claim 1, wherein a lock status of the first client device is updated based on the instructions.

9. The method of claim 8, wherein the updating the lock status of the first client device based on the instructions comprises:
   locking one or more access interfaces of the first client device;
   unlocking one or more access interfaces of the first client device;
   locking one or more functions of the first client device;
   unlocking one or more functions of the first client device;
   blocking access to particular content or all content accessible from the first client device;
   allowing access to particular content or all content accessible from the first client device; or
   logging the event in association with the lock status and a timestamp.

10. The method of claim 1, further comprising:
    receiving, by one or more computer servers of the online social network, an indication of one or more events detected at the first client device, wherein the indication is received prior to determining the level of access; and wherein the determining the level of access is further based on the one or more events.

11. One or more computer-readable non-transitory storage media embodying software operable when executed to:
receive, by one or more computer servers of an online social network, from a first client device associated with a first user, unique data identifying a second user, the unique data being determined in response to an event detected by the first client device, wherein the event was triggered by the second user;
access, by one or more computer servers of the online social network, social-networking information associated with the first user and the second user, wherein the one or more computer servers of the online social network look up the social-networking information using the received unique data;
determine, by one or more computer servers of the online social network, a level of access to access interfaces of the first client device, functionality of the first client device, or content accessible from the first client device, wherein the determining is based on the social-networking information; and
send, by one or more computer servers of the online social network, instructions to evaluate a lock status of the first client device, the instructions comprising the determined level of access to the first client device.

12. The media of claim 11, wherein the unique data comprises an identifier for the second user, the identifier determined based on biometric identification, and wherein the one or more computer servers of the online social network access the social-networking information using the identifier.

13. The media of claim 11, wherein the social-networking information indicates whether the second user is authorized to use the first client device.

14. The media of claim 11, further comprising:
receiving, by one or more computer servers of the online social network, from the first client device, a state of the first client device; wherein
the determining the level of access is further based on the state of the first client device.

15. The media of claim 11, wherein a lock status of the first client device is updated based on the instructions.

16. A computing device comprising:
one or more computer servers of an online social network; and
a memory coupled to the one or more computer servers comprising instructions executable by the one or more computer servers, the one or more computer servers operable when executing the instructions to:
receive from a first client device associated with a first user, unique data identifying a second user, the unique data being determined in response to an event detected by the first client device, wherein the event was triggered by the second user;
access social-networking information associated with the first user and the second user, wherein the one or more computer servers look up the social-networking information using the received unique data;
determine a level of access to access interfaces of the first client device, functionality of the first client device, or content accessible from the first client device, wherein the determining is based on the social-networking information; and
send instructions to evaluate a lock status of the first client device, the instructions comprising the determined level of access to the first client device.

17. The device of claim 16, wherein the unique data comprises an identifier for the second user, the identifier determined based on biometric identification; and wherein the one or more computer servers access the social-networking information using the identifier.

18. The device of claim 16, wherein the social-networking information indicates whether the second user is authorized to use the first client device.

19. The device of claim 16, further comprising:
receiving, from the first client device, a state of the first client device; wherein
the determining the level of access is further based on the state of the first client device.

20. The device of claim 16, wherein a lock status of the first client device is updated based on the instructions.

* * * * *